(12) United States Patent
Hayakawa

(10) Patent No.: US 8,234,651 B2
(45) Date of Patent: Jul. 31, 2012

(54) INFORMATION PROCESSING METHOD AND APPARATUS USING THE SAME

(75) Inventor: Kouichi Hayakawa, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 876 days.

(21) Appl. No.: 11/994,513

(22) PCT Filed: May 31, 2006

(86) PCT No.: PCT/JP2006/310906
§ 371 (c)(1),
(2), (4) Date: Jan. 8, 2009

(87) PCT Pub. No.: WO2007/004374
PCT Pub. Date: Jan. 11, 2007

(65) Prior Publication Data
US 2009/0307701 A1    Dec. 10, 2009

(30) Foreign Application Priority Data
Jul. 6, 2005    (JP) .................................. 2005-198118

(51) Int. Cl.
*G06F 9/46*    (2006.01)
(52) U.S. Cl. ........................................ 718/104; 718/107
(58) Field of Classification Search .................. 718/104, 718/107
See application file for complete search history.

(56) References Cited

U.S. PATENT DOCUMENTS

| 5,596,755 A * | 1/1997 | Pletcher et al. ............... 710/261 |
| 5,915,124 A | 6/1999 | Morris, III |
| 2005/0186625 A1* | 8/2005 | Heeb ................................. 435/6 |

FOREIGN PATENT DOCUMENTS

| JP | 62108346 | 5/1987 |
| JP | 2006085393 | 3/2006 |

OTHER PUBLICATIONS

International Report on Patentability dated Sep. 14, 2007, for the corresponding International Application PCT/JP2006/310906.
International Search Report and Written Opinion of the International Searching Authority dated Aug. 29, 2006, for the corresponding International Application PCT/JP2006/310906.
Notification of Reason(s) for Refusal dated Jul. 12, 2011, from corresponding Japanese Application No. 2005-198118.

* cited by examiner

*Primary Examiner* — Chun-Kuan Lee
*Assistant Examiner* — Benjamin Geib
(74) *Attorney, Agent, or Firm* — Katten Muchin Rosenman LLP

(57) ABSTRACT

A processor processes the task A and the task B sequentially, wherein the task A performs an application to generate data that should be output to or input from an HDD, and the task B controls a data input and output request to the HDD controller.

12 Claims, 5 Drawing Sheets

INFORMATION PROCESSING METHOD AND APPARATUS USING THE SAME

BACKGROUND OF THE INVENTION

1. Field of the Invention

The present invention relates to an information processing technology, in particular, to an information processing method which processes a plurality of tasks in parallel and an information processing apparatus using the same.

2. Description of the Related Art

Recently, in the field of information processing apparatuses, a multi-task function is generally employed, wherein a plurality of programs are simultaneously read into the memory and processed, while changing a plurality of tasks corresponding thereto. A plurality of tasks are scheduled for each time slice by an OS (Operating System) which performs basic controls over an information processing apparatus, and are processed by a processor based on a result of scheduling.

When a task, while being processed by an processor, has a need to access to an I/O (input/output) device such as an HDD (Hard Disk Drive), the task releases the processor so that processing of another task scheduled can be started. When a time slice assigned to a certain task expires, the task is replaced by the next task.

On the other hand, when transferring data to and from external I/O devices, etc., such as writing/reading out data into/from an HDD, or transferring data via a network, or the like, the data is often to be written after being formatted into a form that is suitable for each of the I/O device, or the data in such form is often returned to a standard format after being read out. Such data formatting is generally performed by driver software offered along with an I/O device, or by a communication protocol. Because of this, an activation request for driver software or the like is made by processing of a task of general application software, and the driver software formats data and so forth in response thereto, then controls I/O operations. Conventionally, the processes are distributed in this way.

DISCLOSURE OF THE INVENTION

In the above multi-task processing, when a plurality of tasks issue requests to access to the identical I/O device one after another, the driver software is required to sequentially format data according to the respective requests, and so on. Therefore, a task that has issued an access request later than another task, has to wait until the preceding accesses have been completed. As described above, a task is not processed by a processor while an access to an I/O device is being executed, hence the operation of the task stops during the period including a time needed for an access of another task to be completed. The present inventor has found that, since the greater the number of tasks that can be processed at a same time, the more remarkable this phenomenon, this phenomenon will become an obvious problem as the number of tasks that can be processed at a same time is greater with the progress of the technology in the future.

SUMMARY OF THE INVENTION

The present invention has been made in view of these challenges, and a general purpose of the invention is to provide a technology in which I/O processing can be performed efficiently in a multi-task system.

An embodiment of the invention relates to an information processing method. The method includes: mapping at least part of a memory space assigned to a second task, to a memory space assigned to a first task; and performing part of processing of the first task, based on a leased code which is stored in the memory space assigned to the second task that is mapped to the memory space assigned to the first task.

In the method, when a predetermined operation processing needs to be performed or when data that should be input/output into/from an I/O unit occurs while a first task is being processed, the predetermined operation processing may be performed, or I/O request information may be generated in a form that the I/O unit can recognize, based on a processing code included in a leased code, in the step in which part of processing of the first task is performed.

A "task" herein means any one of an OS that controls an information processing apparatus, application software itself, or a content of information processing to achieve a certain unit of functions included in the OS or application software. "Processing of a first task" and "processing of a second task" may be performed in an identical time slice, or performed in different time slices. Alternatively, these tasks may be processed by a sub-processor included in a processor, or processed by two or more different processors. The above "I/O unit" may be any one of an I/O device such as an HDD or printer, a device or unit which internally has an inherent data processing system and actually inputs/outputs data, or a function block included in a software.

Another embodiment of the present invention relates to an information processing apparatus. The apparatus includes one or more processors which process a plurality of tasks, and a memory having a region assigned to each task, wherein the processor includes a mapping processing unit which maps at least part of a memory region assigned to a second task, to a memory region assigned to a first task, and performs part of processing of the first task, based on a leased code stored in the memory region assigned to the second task that is mapped to the memory region assigned to the first task.

Note that any combination of the aforementioned components or any manifestation of the present invention realized by modifications of a method, device, system, computer program, and so forth, is effective as an embodiment of the present invention.

According to the present invention, data generated in information processing can be efficiently input/output.

DESCRIPTION OF THE REFERENCE
NUMERALS

50 . . . main memory, 200 . . . processor, 202 . . . task processing unit, 204 . . . request format generating unit, 206 . . . data formatting unit, 208 . . . access request issuing unit, 210 . . . HDD controller controlling unit, 212 . . . access information communicating unit, 600 . . . HDD, 650 . . . HDD controller, 1000 . . . information processing apparatus.

BEST MODE FOR CARRYING OUT THE
INVENTION

Embodiment 1

Figure 1:
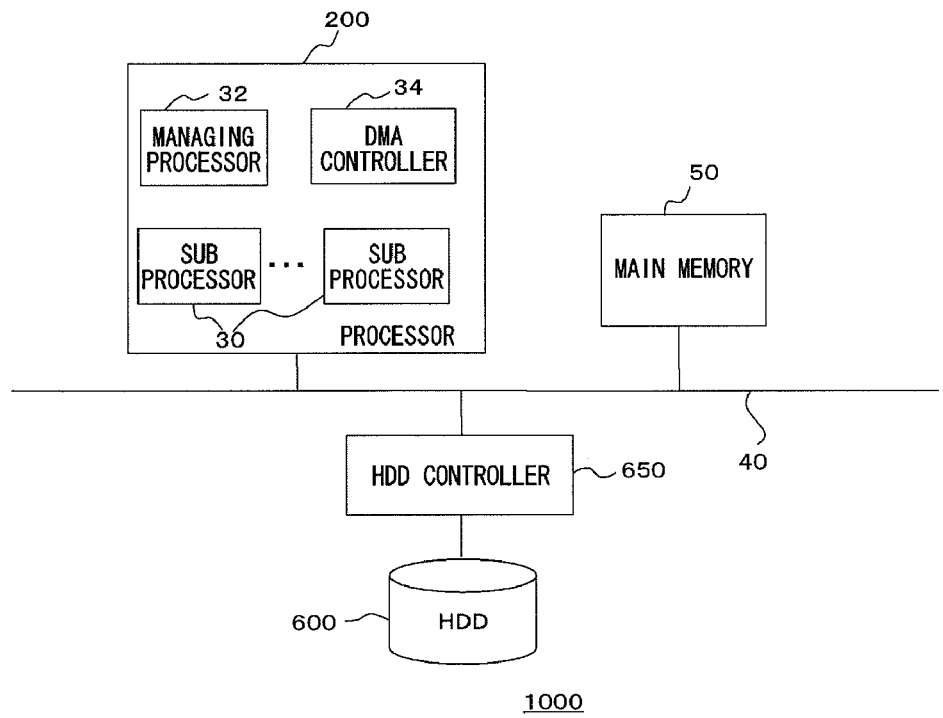
FIG. 1 is a block diagram which shows a structure of an information processing apparatus in accordance with the embodiment 1.

FIG. 1 is a block diagram which shows a structure of the information processing apparatus 1000 in the present embodiment. The information processing apparatus 1000 includes a processor 200, a main memory 50, a HDD controller 650, and a HDD 600, which are all connected together by a bus 40. Each block shown in, for example FIG. 1, as a functional block which executes a variety of processes may be implemented hardwarewise by elements such as a CPU, a memory or other LSIs, and softwarewise by a computer program provided with reservation and management functions and loaded into the memory. Therefore, it should be understood by a person skilled in the art that these functional blocks can be realized in a variety of forms by hardware only, software only or combination thereof, and should not be limited to any one of those.

In the information processing apparatus 1000, an OS is executed, the OS providing a function and environment for using the information processing apparatus 1000 efficiently, and controlling generally the entire apparatus. A plurality of pieces of application software (hereinafter, simply referred to as an "application") are executed by the OS.

The processor 200 includes the plurality of sub-processors 30, a managing processor 32, and a DMA controller 34. The managing processor 32 performs processing in parallel, by time-dividing tasks that correspond to a plurality of applications and I/O control programs, and by assigning the respective time slices to the sub-processor 30 to execute the tasks. One of the tasks processed by the processor 200 is to control the HDD controller 650 for writing and reading out data into/from the HDD 600. The DMA controller 34 controls DMA transfer of data, for example, between the main memory 50 and a buffer in the HDD controller 650.

The main memory 50, which is composed of a DRAM (Dynamic Random Access Memory) or the like, is a storage region in which a machine code that corresponds to an application to be executed or data is stored. A region of the main memory 50 is allocated to each of the plurality of the tasks processed by the processor 200 for using. In the present embodiment, a task which requests an access to the HDD 600 refers to part of a code stored in a region allocated to a task that controls the HDD controller 650, and undertakes part of processing relating to the access, therefore, an access to the HDD 600 can be made efficiently. Furthermore, the main memory 50 is provided with a common region, i.e. a shared memory, in order to communicate data between the tasks.

The HDD controller 650 receives a data I/O request to the HDD 600, the request occurring in processing a task that corresponds to an application, and activates the HDD 600 based on the request. Specifically, the HDD controller 650 receives a request format including a reading out or writing mode, sector number and so on, from the task that the processor 200 processes, and appropriately transmits a signal such as a head selection signal to the HDD 600, thereby making an access to an appropriate sector.

Figure 2:
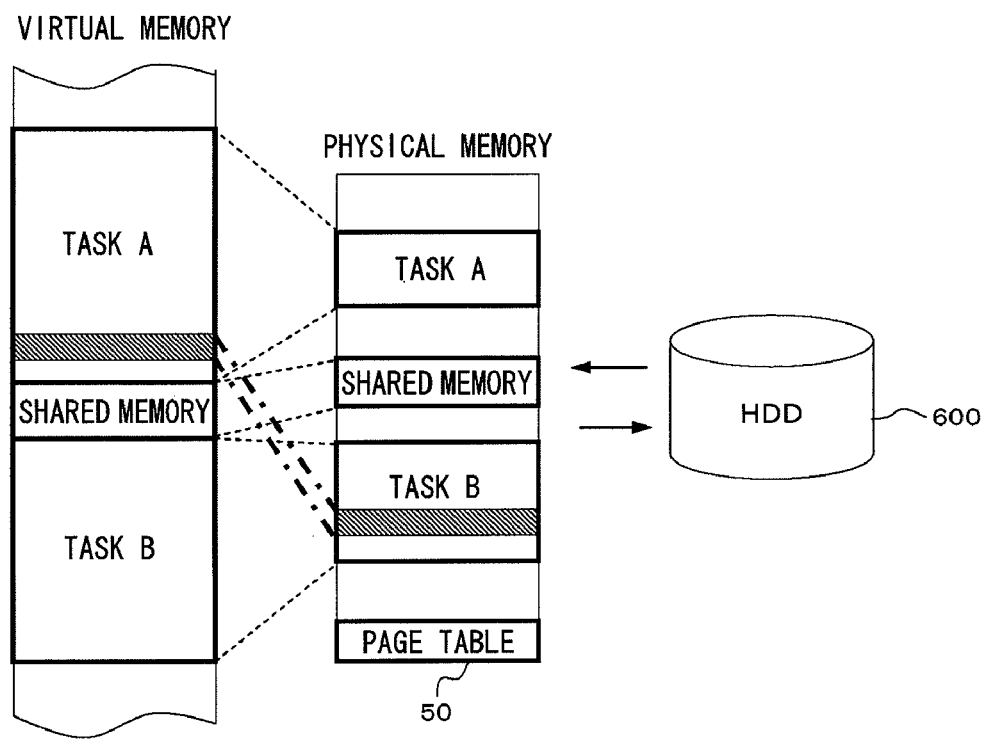
FIG. 2 is a schematic diagram which shows allocation of a main memory in the case where a plurality of tasks are processed in an information processing apparatus in accordance with the embodiment 1.

FIG. 2 schematically shows an allocation of the main memory 50, when a plurality of tasks are processed in the information processing apparatus 1000. In the information processing apparatus 1000, the processor 200 is time divided and the main memory 50 is space divided; thereby each processing time and storage region, which can be used by each of the plurality of tasks, for example, task A and task B, are allocated to respective tasks when they are generated. Since the capacity of the main memory 50 is limited, there are some cases in which codes and data that are used for processing all tasks cannot be stored in the main memory 50 in a multitasking system such as the information processing apparatus 1000.

Therefore, paging etc., is usually performed in which the data which is less often referred to is displaced to the HDD 600, and is read out to the main memory 50, only when necessary. In this case, a concept of a virtual memory, in which the entire data including that saved in the HDD 600 or the like, can be stored, is introduced so that the tasks A and B, which refer to the main memory 50, can make an access to the main memory 50 without being aware of such operations. When the task A or task B requests an access to an address in the virtual memory respectively allocated thereto, the tasks can make an access to the data in the physical memory, which is what the main memory 50 is, by referring to a table such as a page table stored in the physical memory, in which addresses in the virtual memory and physical memory are associated with each other. When the data to which a task desires to refer is not in the physical memory, the data is read out from the HDD 600.

A task corresponding to an application that a user activates is assumed to be the task A. When the task A needs writing or reading out data into/from the HDD 600, the information processing apparatus 1000 generates a task which controls the HDD controller 650. This is assumed as the task B. The task B is a task for separating the specification of the API (Application Program Interface), which is conventionally undertaken by the HDD controller 650, from the HDD controller 650, and for abstracting the hardware including the HDD 600. The task B provides the task A with a service for writing and reading out data into/from the abstracted HDD 600. Specifically, an address of a service code, which is stored in a region of the physical memory allocated to the task B and shown by hatching in FIG. 2, and an address in the virtual memory allocated to the task A, are associated with each other and recorded in a page table as shown by the dashed-dotted line. This allows the task A to refer to a service code held by the task B with the use of normal technique such as paging.

In the case where it is configured such that the task A requests an access to the HDD controller 650 directly without generating the task B, a program of an application corresponding to the task A must be altered, when the hardware composed of the HDD controller 650 and HDD 600 is updated so that the program can correspond to the new hardware. In the present embodiment, a program of an application does not need to be altered when the hardware is updated, because the hardware including the HDD 600 is abstracted and the task A utilizes services for writing and reading out data into/from the abstracted HDD 600. Furthermore, the present embodiment allows an access to be made efficiently by a system in which the task A can refer to the service code and perform processing for generating a necessary request format and for formatting data, before issuing an access request.

Besides that, the task B manages, in the case where there is a task other than the task A, which is being processed, and a plurality of tasks request accesses to the HDD 600 simultaneously, those requests and performs exclusive control of them. Therefore, access competition can be prevented.

Figure 3:
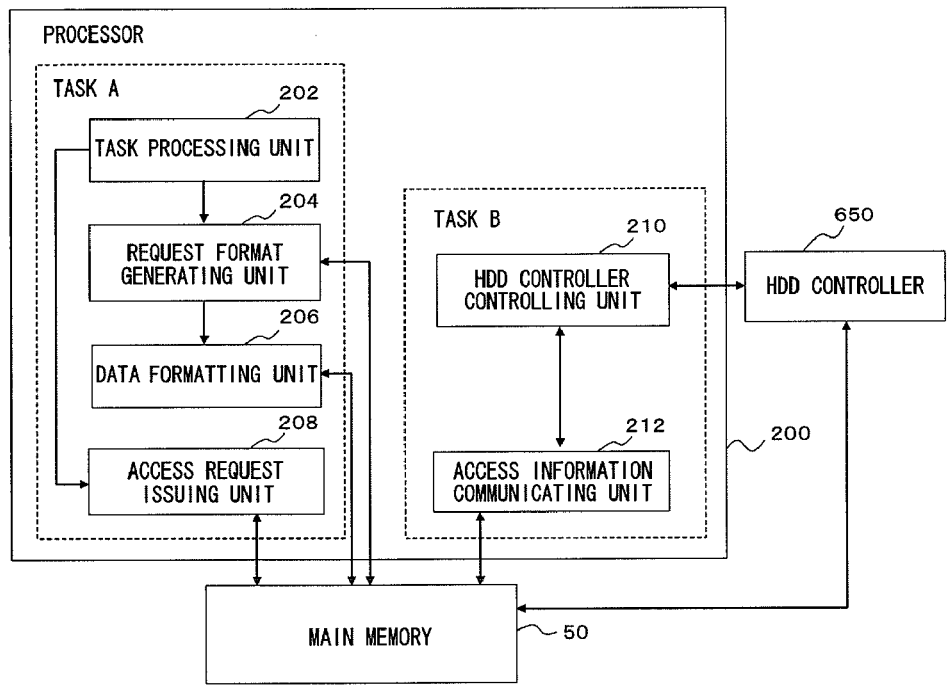
FIG. 3 is a block diagram which shows a structure of a processor of an information processing apparatus in accordance with the embodiment 1.

FIG. 3 is a block diagram which shows a structure of the processor 200 which processes the task A and the task B in the information processing apparatus 1000. In processing the task A, the processor 200 includes: a task processing unit 202 which performs processing corresponding to an application and generates an access request to the HDD 600; a request format generating unit 204 which generates an access request format to the HDD controller 650; a data formatting unit 206 which formats data which is written or read out into/from the HDD 600; and an access request issuing unit 208 which issues an access request for the HDD 600 to the task B or receives various information from the task B.

In processing the task B, the processor 200 includes: the access information communicating unit 212 which receives an access request from the task A or transmits various information to the task A; and the HDD controller controlling unit 210 which arbitrates a plurality of access requests and controls the HDD controller 650 by successively transmitting access request formats generated by the task A to the HDD controller 650. Since the task A and the task B are in fact processed in different time slices by the processor 200, data or notices are communicated between the tasks via the main memory 50.

The task processing unit 202 processing the task A performs processing for executing an application based on a machine code etc., which is stored in the main memory 50. In the middle of the processing, when there is a need of writing or reading out data into/from the HDD 600, the task processing unit 202 gives the request format generating unit 204 and access request issuing unit 208 the information telling the need. The request format generating unit 204 generates a request format that can be recognized by the HDD controller 650, from the access request information received from the task processing unit 202, and stores the format in the main memory 50. A code used for generating a request format is held by a process to which the task B belongs, hence the code is in fact not stored in the storage region of the main memory 50, which is allocated to the task A. However, as described above, it becomes possible that the task A refers to the code by storing the code into a region of the virtual memory allocated to the task A by mapping. A code included in a machine code originally associated with a process of the task B, and referred to by the task A, is hereinafter referred to as a "leased code." A leased code includes a code for generating a request format to write or read out data, and another code for formatting data.

The data formatting unit 206 carves data to be written in accordance with the data size storable in each sector of the HDD 600. The data formatting unit 206 also connects pieces of data read out for each sector to form them into a piece of data. The access request issuing unit 208 issues an access request for the HDD 600 in a form that the task B can recognize. For example, the task request issuing unit 208 makes the task B recognize the address information of a region in the main memory 50 where a generated request format is stored, by writing the address information into a region of the shared memory region of the task A and the task B.

The access information communicating unit 212 when the task B is performed recognizes an access request for the HDD 600 issued by the task A, and initializes a service in order to provide the task A with the service necessary for writing and reading out data. For example, the task B reads out a certain region of the shared memory, and confirms whether the address information of the request format is written into by the task A, or not. When the information written, the task B appropriately initializes a service. Besides that, the access information communicating unit 212 also performs processing for terminating a service or for sharing the main memory 50 with the task A.

The HDD controller controlling unit 210 initializes the HDD controller 650. In addition, the controlling unit manages each sector range of the HDD 600, which can be used by each task that requests an access, such as the task A. All tasks that request accesses have ID information that can be uniquely identified, therefore the HDD controller controlling unit 210 manages a task that can use the HDD 600 and a usable sector range thereof, by using the ID information. If an access request received by the access information communicating unit 212 is one which requests an access to a sector out of the usable sector range, the access is not permitted. An access request permitted is set in the HDD controller 650 by the HDD controller controlling unit 210. The HDD controller controlling unit 210 further performs control of activating the HDD controller 650 and receipt an interrupt from the HDD controller 650.

A request format generated by the request format generating unit 204 includes, for example, five fields including first to fifth fields having a length of 32 bits respectively. In the first field, mode identification information indicating writing or reading, and a processing result of the HDD controller 650, are registered; in the second field, the sector number in the HDD 600; in the third field, a storage address for data to be written or to be read out, of the main memory 50; in the fourth field, a size of data to be written or to be read out; and in the fifth field, an address of a next request format stored in the main memory 50 are registered, respectively.

The HDD controller controlling unit 210 activates operation of the HDD controller 650 by writing a head address in the main memory 50 of a request format that is permitted to access, into the request format address register included in the HDD controller 650. At the time, the start bit of the operation register included in the HDD controller 650 is set to "1". The HDD controller 650 keeps setting the running bit in its own state register to "1" until the processing is completed. The HDD controller 650, upon finishing a processing related to the recognized request format, sets both the start bit of the operation register and the running bit in the state register, to "0", and after that, generates an interrupt signal to the processor 200.

Figure 4:
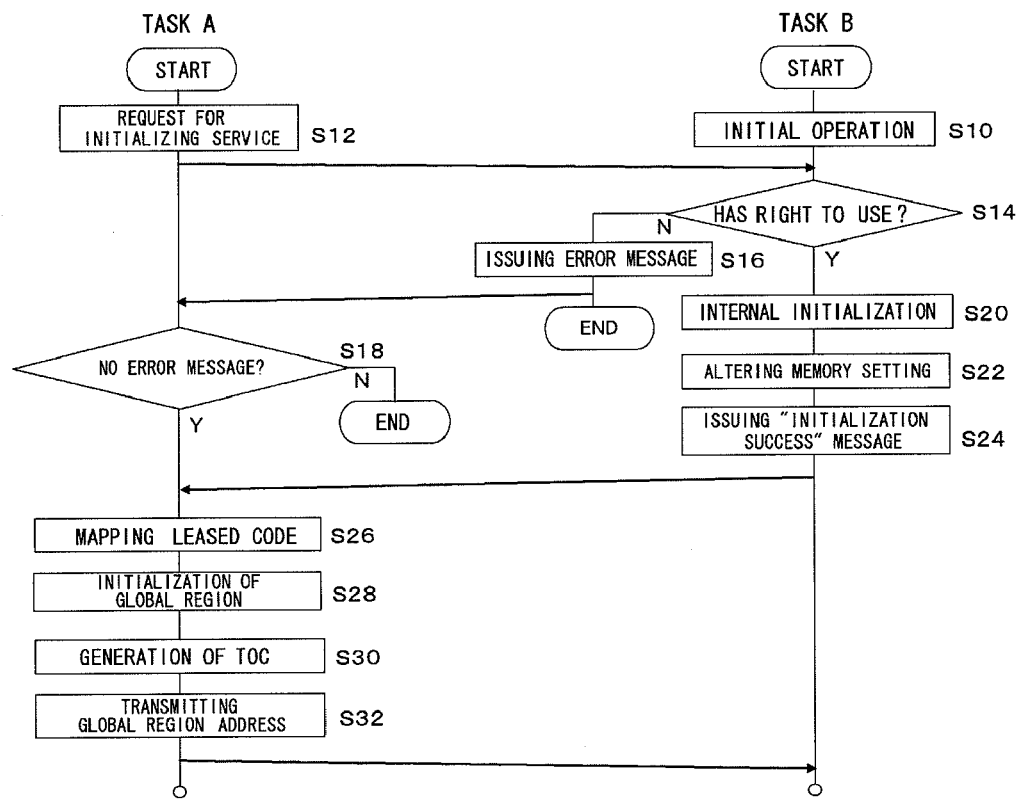
FIG. 4 is a flow chart which shows a procedure for activating a task which provides a service for writing data and for initializing the service, in accordance with the embodiment 1.
Figure 5:
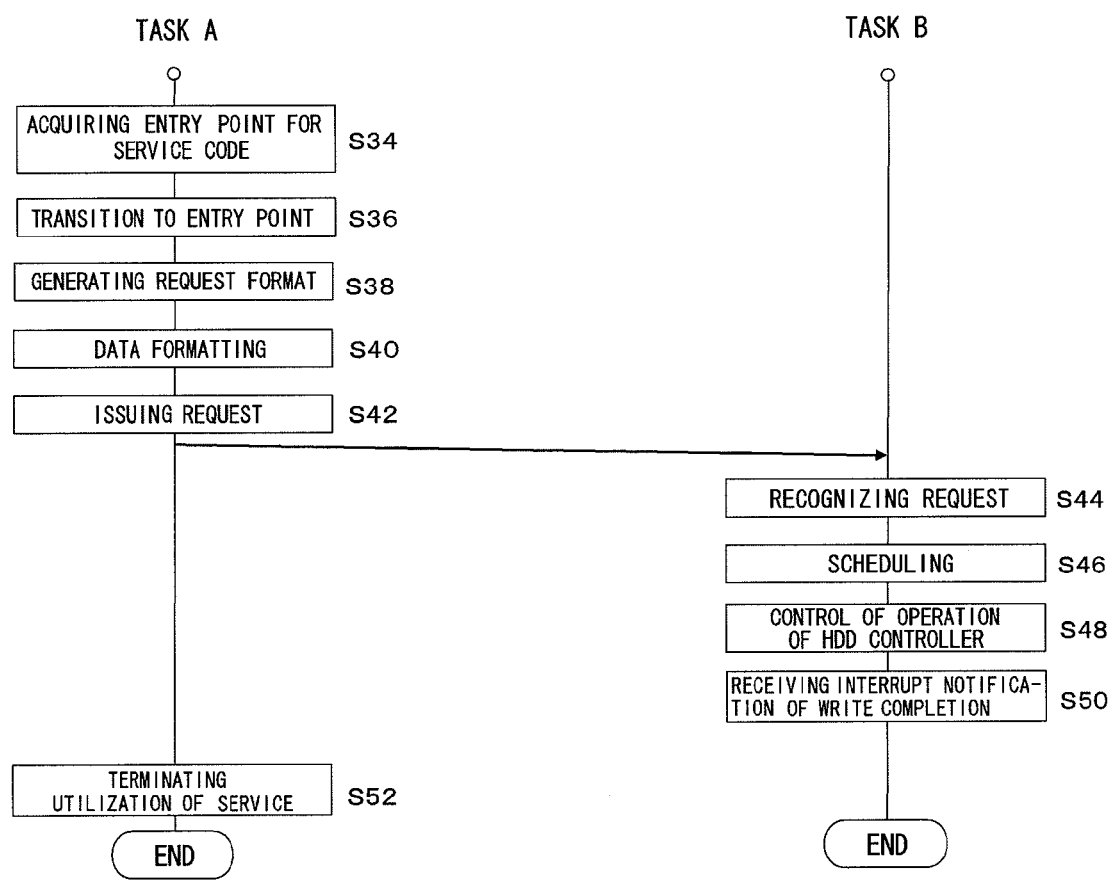
FIG. 5 shows a procedure in which a task utilizes a service for writing data in accordance with the embodiment 1.

In the above structure, a processing procedure for writing data into the HDD 600 will be explained below. In FIG. 4, processing procedures of activating the task B and initializing services provided to the task A by the task B, are shown. In FIG. 5, a procedure through which the task A utilizes the services after the services are provided, is shown.

When it is needed for the task processing unit 202 performing the task A to write data into the HDD 600, the task B is scheduled by the managing processor 32 included in the processor 200, and executed by the sub-processor 30. As shown in FIG. 4, the HDD controller controlling unit 210, in activating the task B, performs initial operations including initializing the HDD controller control program, initializing the HDD controller 650, and initializing the HDD 600 (S10). Initializing the HDD controller control program includes initializing a table in which a task that can use the HDD 600 and a usable sector range thereof are associated with each other. The initial operation is performed only when the task B is newly activated. A request for a service provided by the task B that is already in operation can be made by the processing described below.

Initializing processing is then performed, by which the task A utilizes a service provided by the task B. At first, the access request issuing unit 208 of the task A issues a request for initializing services to the task B (S12). The request includes the ID information for identifying the task A. The issued request for initializing services is stored in a region of the shared memory in the main memory 50, or the like, so that the request can be recognized when the task B is processed next time in the processor 200. The task B which recognizes a request for initializing, confirms whether the task A that requests the initialization has the right to use the HDD 600 or not, based on the ID information (S14). If the task A does not have the right (N at S14), the task B issues an error message to the task A (S 16), and terminates all the sequence. The error message thus issued is stored in the shared memory region of the main memory 50 and so forth, so that it can be recognized when the task A is processed next time in the processor 200.

When the task A has the right to use the HDD 600 (Y at S14), the task B performs processing for initializing a storage region of the main memory 50, which is allocated to the task B (S20). The above initialization processing includes securing a region for receiving a writing request, initializing the region, and initializing variables used for providing services, or the like.

The HDD controller controlling unit 210 then alters the settings of the storage region of the main memory 50, in which a leased code used by the task A for generating a request format is stored, so that the region can be referred to while the task A is being processed (S22). When initialization of a service on the side of the task B is completed with the above processing, the access information communicating unit 212 issues a message telling initialization of the services has been successful, to the task A (S24). The message includes information such as the address of a leased code in the main memory 50, a size of a storage region of the main memory 50 which is needed when the task A generates a request format using a leased code, etc., and a size of the stack needed.

When next processing of the task A starts in the processor 200, the request format generating unit 204, based on the information included in the message telling initialization of a service has been successful, which is issued by the task B, initializes the service on the side of the task A, as described below. At first, the request format generating unit 204 maps the storage region in which a leased code is stored in the main memory 50, to a storage region in the main memory 50 allocated to the task A (S26). The unit 204 then secures a storage region which is needed in processing by a leased code, in a storage region of the main memory 50 allocated to the task A, and alters the settings of the storage region so that the region can be accessed by and shared with the task B, thereafter initializing the region (S28). The storage region is hereinafter referred to as a "global region."

The unit 204 performs processing for generating a TOC (Table Of Contents) which indicates entry points of various services in a leased code, so that the task A can utilize those services, such as writing or reading out data into/from the HDD 600, or the like (S30). The unit 204 then communicates the address of the global region in the main memory 50 secured in S 28, to the task B (S32). In this step, the unit 204 may store the address information in the shared memory region of the main memory 50. If necessary, the task B may initialize the global region.

The task A then utilizes the service of writing data into the HDD 600 as shown in FIG. 5. At first, the task A acquires an entry point of a function for writing data, the function being included in a leased code, from a TOC (S34). Names commonly used and easy to understand are beforehand given to the respective functions, the names being keys when the TOC is referred. For example, "DISK-W" may be used for writing, and "DISK-R" may be used for reading. When creating a program of an application corresponding to the task A, the name defined as such may be used. Thus, a versatile application program can be created without being aware of the specification of the HDD 600. The processing of the task A is then branched to an entry point acquired (S36). The storage region, which is used after a processing of the task A is branched, is set in advance to be located within the global region.

The request format generating unit 204 and the data formatting unit 206 then perform generating a request format and formatting data to be written using a function for writing data at the destination of the branch, respectively (S38, S40). As described above, the request format includes five kinds of information separately stored in five fields, and each request format is associated with data to be written that has a data size storable in a sector, such as 512 bytes. When data to be written has a data size exceeding the data size storable in a sector, the data formatting unit 206 divides the data into pieces of data each of which has the storable data size, and the request format generating unit 204 generates a request format for each piece of the data. A request format thus generated and data to be written formatted are stored in the global region of the main memory 50.

When generating a request format and formatting data are completed, the access request issuing unit 208 writes the information telling they are completed into the shared memory region, allowing the task B to recognize a writing request (S42). For example, the access request issuing unit 208 writes the head address of the request format into a certain region. In the task A, generating request formats and formatting data for a plurality of access requests including writing and reading out data into/from the HDD 600 are performed sequentially as needed, regardless of whether the task B recognizes those requests. A plurality of access requests are accumulated in the global region until the task B recognizes those requests and starts processing appropriately. As described above, the accumulated requests are linked together in a way that a subsequent request format is identified by the address stored in the fifth field of a request format generated immediately before, thereby forming a series of access requests.

The access information communicating unit 212 in the task B recognizes a writing request from the task A by checking the shared memory in each processing time allocated to the task B, and so forth (S44). When the access information communicating unit 212 recognizes access requests from a plurality of tasks including the task A at a same time, the HDD controller controlling unit 210 arbitrates the order of accesses to the HDD 600, based on the general criteria concerning priority or others, and schedules the requests (S46). The access information communicating unit 212 activates the HDD controller 650 by providing the HDD controller 650 with a head address of a request format stored in the global region, based on the result of scheduling, and achieves writing data into the HDD 600 (S48). When processing for writing data into the HDD 600 is completed, the HDD controller 650 generates an interrupt signal directed to the processor 200, as described above, and the task B receives the signal (S50).

Until all the data to be written, which is generated in the task A, is written into the HDD 600, the steps from S34 to S50 are repeated. The access request issuing unit 208 transmits a signal telling utilization of the service is terminated, to the task B as needed, for example, when data to be written is no longer present or a processing time of the task A is about to end. The request format generating unit 204 performs processing for terminating the utilization of the service, wherein the TOC generated in S30 and the mapped region of the leased code generated in S26, are discarded, and so on (S52). At the time, after confirming that all the data to be written, which has been requested, is already written, the request format generating unit 204 changes the settings of the main memory 50 so that an access to the global region by the task B is no longer permitted. Processing for writing data into the HDD 600, which is generated in the task A, is completed with the above processing.

Figure 6:
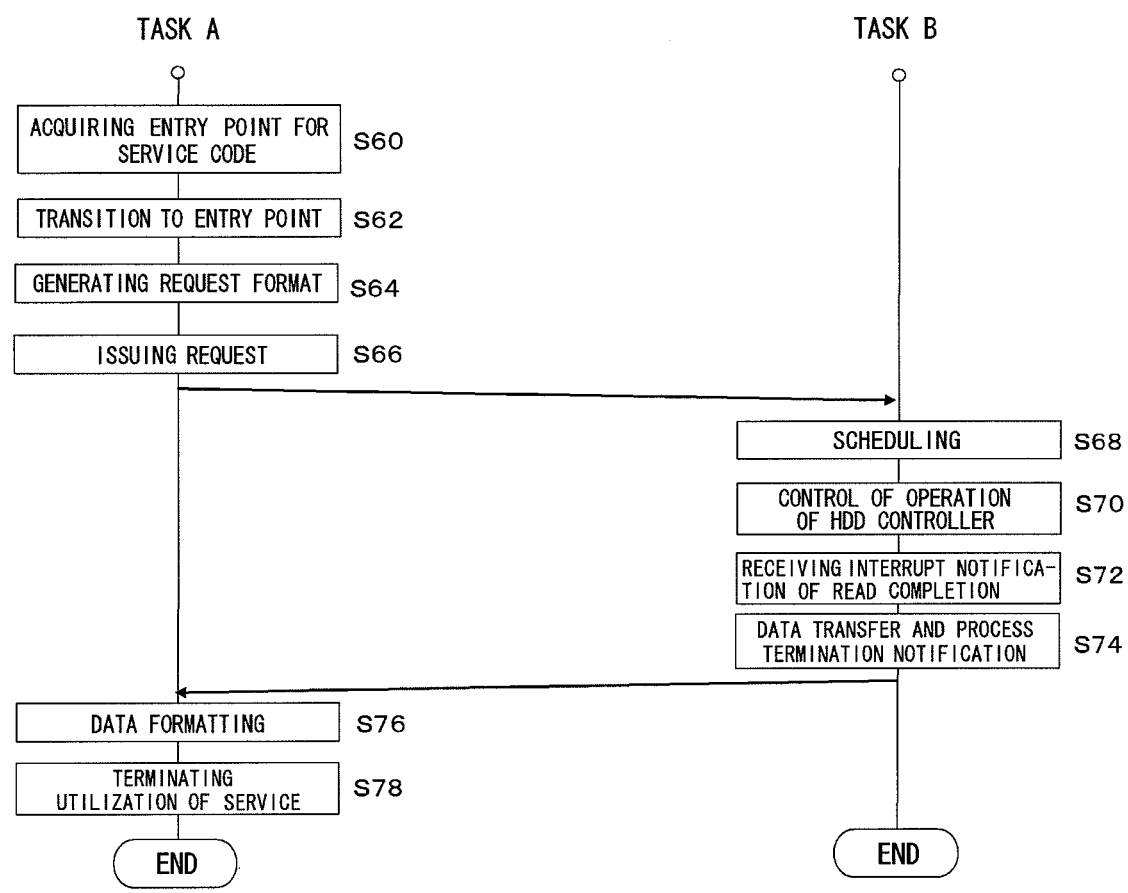
FIG. 6 shows procedures in which a task utilizes a service for reading out data in accordance with the embodiment 1.

Next, a processing procedure for reading out data from the HDD 600 with the same structure will be explained, with the focus being placed on the points different from the case of writing data. Activating the task B and processing procedures of initializing services provided to the task A by the task B, are performed in the same way as with FIG. 4. FIG. 6 shows processing procedures in which the task A utilizes services for reading out data. In the same way as with utilizing services for writing data, the request format generating unit 204 in the task A, at first acquires an entry point of a function for reading out data from a TOC, and branches processing of the task A to the entry point (S60, S62). Following that, the request format generating unit 204 generates a request format (S64). The region for the data read out in the global region, of which address is designated at the time, is empty so that the data to be read out from the HDD 600 can be stored. When data having a size exceeding that storable in a sector is read out, a request format is generated for each of the storable data size.

When the generation of a request format is completed, the access request issuing unit 208 allows the task B to recognize the read request, in the same way as with processing for writing data (S66). The access information communicating unit 212 in the task B recognizes the read request from the task A, and the HDD controller controlling unit 210 schedules an access to the HDD 600 (S68). Based on the result, the HDD controller controlling unit 210 activates the HDD controller 650 by providing the HDD controller 650 with the head address of a read request format in the global region, and achieves reading out data from the HDD 600 (S70). The HDD controller 650 stores the data read out from the HDD 600 into a buffer included in the HDD controller 650. When processing for reading out data is completed, the HDD controller 650 generates an interrupt signal directed to the processor 200, which is received by the task B (S72).

The access information communicating unit 212 in the task B then allows the task A to recognize that the processing of reading out data from the HDD 600 is completed by writing the information into the shared memory and so on, as well as performs processing for transferring the data read out from the buffer of the HDD controller 650, to the address of the global region designated by the read request format (S74). Transferring the data read out can be performed by using the DMA controller 34 provided in the processor 200. The data transferred is stored in the global region separately in units of a data size storable in a sector of the HDD 600, therefore the data formatting unit 206 in the task A combines the separate data together into a peace of data (S76). At the time in the task A, processing for formatting data is performed by branching the processing to a function for formatting data in a leased code. Until all the data to be read out is read out, the steps from S60 to S76 are repeated. And in the same way as with processing for writing data, processing for terminating the utilization of the service is performed in the task A as needed.

According to the present embodiments described above, the specification of an API for using an HDD driver is separated from the hardware of the HDD controller, thereby abstracting the hardware. A task mediating between an application and an HDD belongs to a process different from what the application belongs to, and the application utilizes a service provided by the process. With this, an application does not need to be updated in response to the alteration of the hardware including an HDD. Furthermore, in creating an application program, it is not required to take the specification of a HDD connected to an apparatus into consideration; therefore a versatile programming, which corresponds to HDDs with various specifications, can be possible with relatively easy settings of the program. In addition, the mediating task temporarily lends a code to a task of an application to provide services, and the task of the application utilizes the code to perform processing for generating a request format or for formatting data in its time slice in advance. Hence, when a plurality of tasks issue access requests at a same time, accesses can be made more efficiently in comparison with a conventional system in which a task performs a series of I/O processing, such as generating request formats, formatting data, and scheduling accesses etc., after receiving the access requests. The present system can therefore reduce a time period during which a task of an application is suspended for waiting I/O processing. This is especially effective for applications of games or the like in which the real time property is important. Furthermore, the present embodiment can be practiced by the same hardware structure as with conventional apparatuses, therefore the embodiment can be introduced without a major obstacle and at a low cost.

Embodiment 2

Figure 7:
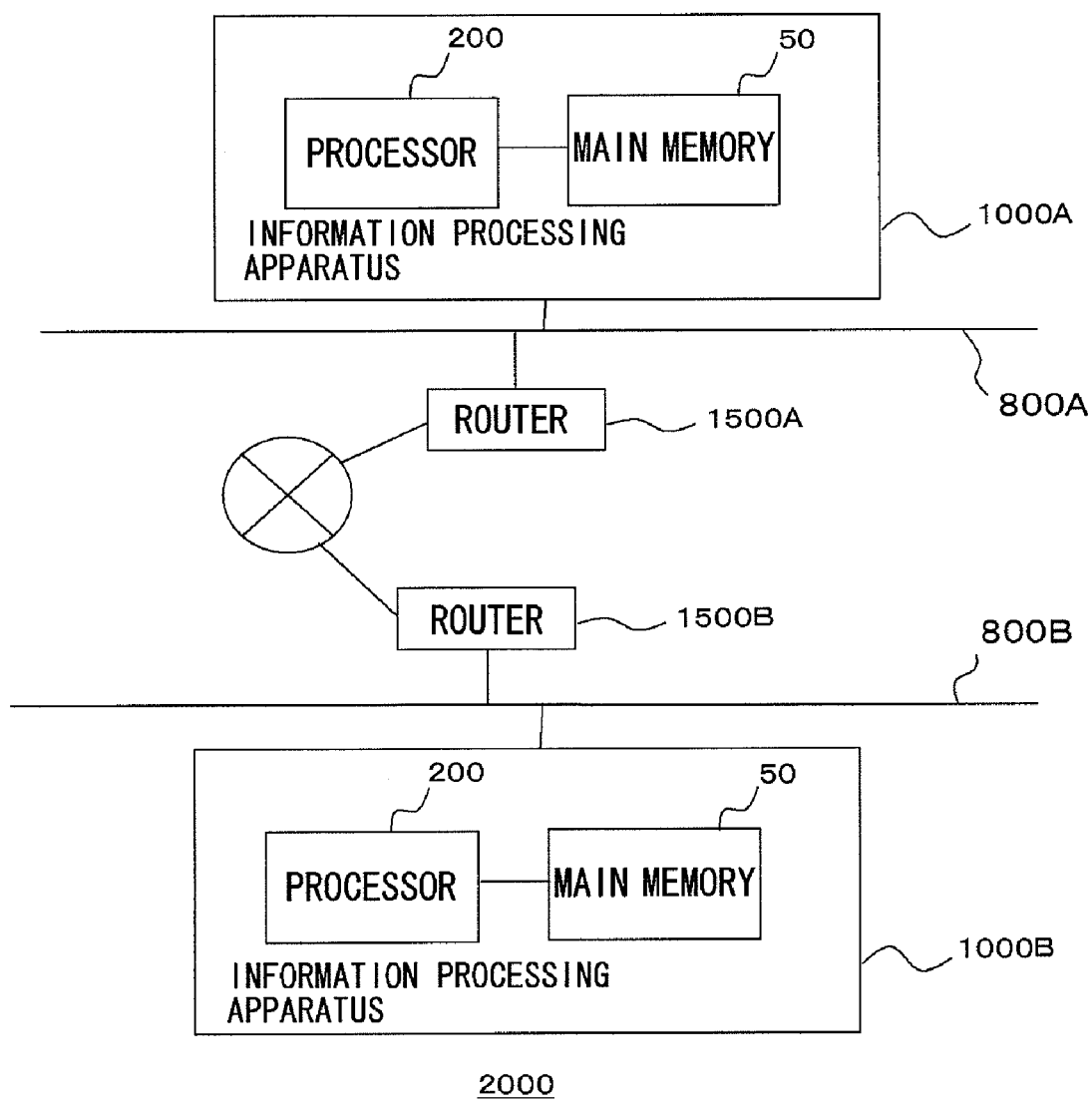
FIG. 7 is a block diagram which shows an entire structure of a system including an information processing apparatus in accordance with the embodiment 2.

FIG. 7 is a block diagram which shows an overall structure of the system 2000 including the information processing apparatus 1000 in accordance with the present embodiment. In the present embodiment, the system 2000 has a structure in which the plurality of information processing apparatuses 1000A and 1000B are connected to different LANs (Local Area Networks) 800A and 800B, and connected to the Internet via respective routers 1500A and 1500B. In such a system structure, for example, when data is transformed from the information processing apparatus 1000A to the information processing apparatus 1000B, processing for data transfer is performed by a common protocol between the information processing apparatuses 1000A and 1000B. A data size that can be transmitted in the physical layer of the protocol at one time is given, therefore data to be transferred exceeding the data size is divided in the transport layer or the network layer etc., then transmitted in packet units with a header including the information for transfer, such as a sequence number and an IP address, added to the respective divided data. In the present embodiment, a task in the information processing apparatus 1000A, which requests data transfer, performs processing for formatting data like this.

Fundamental operations are the same as with the embodiment 1, therefore only the points different from the embodiment 1 are referred to. In the embodiment 1, the task B abstracts part of processing of the HDD controller 650 and provides a service in order to allow the task A, which requests an access to the HDD 600, to perform the processing. In the present embodiment, the task B provides a service so that the task A can perform, for example, part of processing of the TCP (Transmission Control Protocol) in the transport layer of the protocol. Therefore, the task B holds a service code, which is a function that the task A can refer to, in the main memory 50 after abstracting part of processing codes of the TCP.

Similarly to what is shown in FIG. 4 in the embodiment 1, the task A requests the task B to initialize the service, and the task B performs various initialization processing. The task A maps a service code of the task B including a function for generating segments from data to be transferred, to an allocated region of the main memory 50. The task A then generates a TOC and communicates an address of the global region to the task B, in the same way as with the embodiment 1. Furthermore, similarly to FIG. 5, the task A performs processing for dividing the data to be transferred and for adding a necessary header thereto, by branching the processing of the task A to the entry point in the service code, and generates segments. When segments are generated, the task B receives a communication telling segments are generated and appropriately activates an application for transmitting data in the application layer. After that, data transfer is performed from the information processing apparatus 1000A to the information processing apparatus 1000B by a normal protocol processing, however, the TCP of the information processing apparatus 1000A has only to perform processing other than generating segments, such as establishing a connection or the like, because segments have been already generated. Furthermore, the TCP in the information processing apparatus 1000B transfers the received segments as they are by DMA by using the DMA controller 34, to a region of the main memory 50 allocated to the task corresponding to the application which is to receive the data. The task connects the segments into a piece of the data by utilizing a service in which part of processing of the TCP is abstracted.

According to the present embodiment described above, a part of proceeding of the protocol which performs network communications is separated and abstracted, in the same way as with the embodiment 1. A task of an application, which requests to transfer data formats data into a form suitable for transfer in its own time slice, by lending the code temporarily. With this, a load of protocol such as TCP can be reduced, and, even when a plurality of requests for data transfer occur from a plurality of tasks at a same time, connection establishment and data transfer control can be achieved effectively. Furthermore, since the information processing apparatus 1000A which transmits data issues a request for data transfer after generating in advance a plurality of segments of which a piece of data is composed, the segments can be transferred continuously. Hence, the information processing apparatus 1000B which receives the data has only to send an ACK (Acknowledgment) segment, which is a signal for confirming response, once when continuous transferring of the segments is completed, which can reduce the number of communications between the information processing apparatuses 1000. Therefore, a waiting time occurring while network communications are being processed can be reduced, which brings about a significant advantage especially to an application in which the real time property is important, such as a game application performed via a network. Furthermore, the system can be practiced with a hardware structure conventionally used, therefore the system can be introduced at a low cost.

The present invention has been described above in conjunction with the embodiments thereof. The embodiment has been given solely by way of illustration, and it will be understood by a person skilled in the art that various modifications may be made to combinations of the foregoing components and processes, and all such modifications are also intended to fall within the scope of the present invention.

For example, in the above embodiments, a processor is time divided so that a task for providing services and a task of an application which utilizes the services, are processed sequentially in their respective time slices, however, the tasks may be independently processed by a plurality of processors. Also in this case, when a plurality of tasks of an application request accesses to an HDD or data transfer at a same time, the load of tasks which control accesses or data transfer can be reduced by formatting in advance necessary data in the respective requesting tasks, which allows accesses or data transfer to be performed efficiently.

In the above embodiments, a task which corresponds to an application and a task which controls data input and output, are given as the task A utilizing the service and the task B providing the service respectively by way of examples. However, each of the two may be any task which is processed by a processor, such as a task which realizes a function provided by an OS. For example, the task B may be a task which provides a file system to an application, or which provides a network environment to an application, or the like. Also in this case, an overall processing is improved in its efficiency by a processing in which part of processing included in a task is processed in a time slice of another task, or processed by a processor which processes another task. In some cases, versatile processing can be possible even if the hardware connected changes in its specification, in the same way as shown in the embodiment 1.

INDUSTRIAL APPLICABILITY

As described above, the present invention can be used in electronic apparatuses which perform a plurality of tasks in parallel, such as computers, game devices.

What is claimed is:

1. An information processing method comprising:
   mapping at least a part of a memory space allocated to a second task, to a memory space allocated to a first task;
   performing a part of processing of the first task, based on a leased code which is stored in the memory space allocated to the second task that is mapped to the memory space allocated to the first task, wherein,
   when data which should be input to or output from an input and output unit occurs in processing of the first task, the performing a part of processing of the first task includes generating input and output request information in a form that the input and output unit can recognize, based on a processing code included in the leased code; and
   the information processing method further comprises issuing an input and output request to the input and output unit, in processing of the second task, based on the input and output request information.

2. The information processing method according to claim 1, wherein the generating input and output request information includes formatting data which should be output into a form that corresponds to a processing system of the input and output unit, based on the processing code included in the leased code, and storing the formatted data in a memory space shared by the first task and the second task; and
   the issuing an input and output request to the input and output unit includes reading out the formatted data from the shared memory space, and writing the data into a buffer of the input and output unit.

3. The information processing method according to claim 1, wherein the method further comprises: forwarding the data, which is input from the input and output unit in accordance with the input and out request, to the memory space allocated to the first task in processing of the second task; and
   formatting the forwarded data into a form that corresponds to a processing system of the first task, in processing of the first task, based on a processing code included in the leased code.

4. The information processing method according to claim 1, wherein the method further comprises, after the mapping, generating a table in which a predetermined name of a processing content and an entry point, which shows a location of a processing code which corresponds to the processing content in the memory space mapped, are associated with each other; and the method branches a processing to an entry point of a processing code which corresponds to a necessary processing content, in processing of the first task, based on a name of the processing content.

5. An information processing apparatus comprising:
one or more processors which process a plurality of tasks; and
a memory including a region allocated to the each task, wherein the processor comprises a mapping processing unit which maps at least a part of a region of the memory allocated to a second task, to a region of the memory allocated to a first task,
an input and output request information generating unit, when data which should be input to or output from an input and output unit occurs in a processing of the first task, which generates input and output request information in a form that the input and output unit can recognize, based on a processing code included in a leased code stored in the region of the memory allocated to the second task which is mapped to the region of the memory allocated to the first task, and
a request issuing unit which issues an input and output request to the input and output unit, in a processing of the second task, based on the input and output request information.

6. The information processing apparatus according to claim 5, wherein the processor further comprises a data formatting unit which formats data which should be output into a form that corresponds to a processing system of the input and output unit, based on the processing code included in the leased code, and stores the data into a memory shared by the first task and the second task, in processing of the first task; and the request issuing unit reads out the formatted data from the shared memory and forwards the data to a buffer of the input and output unit.

7. The information processing apparatus according to claim 5, wherein the processor further comprises:
a DMA (Direct Memory Access) controller which forwards the data input from the input and output unit in accordance with the input and output request, to the region of the memory allocated to the first task, in processing of the second task; and
a data formatting unit which formats the forwarded data into a form that corresponds to a processing system of the first task, based on a processing code included in the leased code, in processing of the first task.

8. The information processing apparatus according to claim 5, wherein the input and output request information generating unit stores a plurality of pieces of input and output request information in the memory shared by the first task and the second task; and the request issuing unit sequentially issues an input and output request to the input and output unit, based on a result of scheduling a plurality of input and output requests stored in the shared memory after arbitrating those requests.

9. The information processing apparatus according to claim 8, wherein the input and output request information includes information on a storage region of the shared memory in which input and output request information that is to be generated subsequently by the input and output request information generating unit is stored; and the request issuing unit sequentially reads out a plurality of pieces of input and output request information, which are generated by the input and output request information generating unit, from the shared memory, based on the information on the storage region.

10. An information processing apparatus comprising:
one or more processors which process a plurality of tasks; and
a memory including a region allocated to the each task, wherein the processor comprises a mapping processing unit which maps at least a part of a region of the memory allocated to a second task, to a region of the memory allocated to a first task,
a data formatting unit which, when data to be transferred to another processor via a network occur in processing of the first task, formats the data which should be transferred into a form that corresponds to a communication protocol by which data transfer is performed, based on a processing code included in a leased code stored in the region of the memory allocated to the second task which is mapped to the region of the memory allocated to the first task; and in addition to that, formats the data that is transferred from another processor, into a form that corresponds to a processing system of the first task, and
a transferring unit which transfers data to/from another processor, in a processing of the second task.

11. A computer program product comprising:
a module which generates data which should be input or output in processing of a first task;
a module which maps at least a part of a memory space allocated to a second task that controls an input and output request to an input and output unit, to a memory space allocated to the first task;
a module which generates input and output request information in a form that the input and output unit can recognize in processing of the first task, based on a leased code which is stored in the memory space allocated to the second task that is mapped to the memory space allocated to the first task; and
a module which issues an input and output request to the input and output unit, in processing of the second task, based on the input and output request information.

12. A computer-readable recording medium having embodied thereon a program product comprising:
a module which generates data which should be input or output in processing of a first task;
a module which maps at least a part of a memory space allocated to a second task that controls an input and output request to an input and output unit, to a memory space allocated to the first task;
a module which generates input and output request information in a form that the input and output unit can recognize in processing of the first task, based on a leased code which is stored in the memory space allocated to the second task that is mapped to the memory space allocated to the first task; and
a module which issues an input and output request to the input and output unit, in processing of the second task, based on the input and output request information.

* * * * *